United States Patent Office 3,349,092
Patented Oct. 24, 1967

3,349,092
HEXAHYDRODICYCLOPENTAPYRIDINE AND OCTAHYDROPHENANTHRIDINE COMPOUNDS AND METHOD OF MANUFACTURE
Harry Chafetz, Poughkeepsie, N.Y., and Richard C. Anderson, Logan, Utah, assignors to Texaco Inc., New York, N.Y., a corporation of Delaware
No Drawing. Filed Mar. 31, 1964, Ser. No. 356,064
7 Claims. (Cl. 260—283)

This invention relates to a novel method of preparing heterotricyclic compounds of the formula:

I and

II wherein $R^1$ is a substituent selected from the group consisting of hydrogen and alkyl, alkaryl, aralkyl and aryl of from 1 to 10 carbons wherein two of said $R^2$, $R^3$ and $R^4$ groups are hydrogen and the third is the same as $R^1$, and wherein $R^1$ is never attached to the 4th and 10th ring position carbons. The invention also pertains to the novel heterotricyclic compounds as described by the above Formula II wherein $R^1$ is other than hydrogen.

The heterotricyclic compounds formed by the method of the invention are useful as corrosion inhibitors in amounts of between about 0.5 and 5 wt. percent in acid pickling baths and petroleum well acidizing solutions.

The method of the invention prepares complex heterotricyclic compounds as described above in relatively high yields. Specifically, the heterotricyclics contemplated herein are formed by the reaction of ammonia with a cycloalkanone of the formula:

wherein $R^1$ is a substituent selected from the group consisting of hydrogen and alkyl, aryl, alkaryl and aralkyl of from 1 to 10 carbons in a molar ratio of ammonia to cycloalkanone of between about 100:1 and 1:5 in the presence of a catalyst selected from the group consisting of silica, alumina, silica-alumina, silica or alumina containing minor amounts (e.g. 5–40 wt. percent) of magnesia or chromia, and mixtures thereof. The reaction is conducted in the absence of oxygen and at a temperature between 200 and 420° C. The reaction may be practiced under subatmospheric and superatmospheric pressure up to 50 p.s.i.g., however, atmospheric pressure is normally employed. Although the time of reactant contact with catalyst may be varied over a wide range, it has been found that a contact time of between about 3 and 20 seconds results in optimum yields. Further, a preferred catalyst is silica-magnesia. Also, under preferred conditions the catalyst particle size is between about 1/16 and 1/2 inch diameter.

The reaction is conducted in the absence of an oxygen containing gas such as air in order to prevent the formation of oxidation by-products. Standard methods of removing oxygen may be employed such as an inert gas sweep prior and/or during the reaction. An example of a suitable inert gas is nitrogen.

A further description of the reaction can be found in the following equations:

I.

II.

III.

$R^1$ in the above formulas is as heretofore defined. $R^{y2}$ and $R^{y4}$ are radicals wherein one is hydrogen and the other is the same as $R^1$.

Examples of the cycloalkanone reactants contemplated herein and the corresponding heterotricyclic product derived therefrom are as follows:

cyclopentanone: 5-butyl-1,2,3,6,7,8-hexahydrodicyclopenta[b,d]pyridine;
cyclohexanone: 6-pentyl-1,2,3,4,7,8,9,10-octahydrophenanthridine;
4-methylcyclohexanone: 2,8-dimethyl-6-(3-methylpentyl)-1,2,3,4,7,8,9,10-octahydrophenanthridine;
3-methylcyclohexanone: 1,7-1, 1,9- 3,7- or 3,9-dimethyl-6-(2- or 4-methylpentyl)-1,2,3,4,7,8,9,10-octahydrophenanthridine;
4-decylcyclohexanone: 2,8-didecyl-6-(3-decylpentyl)-1,2,3,4,7,8,9,10-octahydrophenanthridine;
4-phenylcyclohexanone: 2,8-diphenyl-6-(3-phenylpentyl)-1,2,3,4,7,8,9,10-octahydrophenanthridine;
4-naphthylcyclohexanone: 2,8-dinaphthyl-6-(3-naphthylpentyl)-1,2,3,4,7,8,9,10-octahydrophenanthridine;
4-o-tolylcyclohexanone: 2,8-di-o-tolyl-6-(3-o-tolylpentyl)-1,2,3,4,7,8,9,10-octahydrophenanthridine; and
4-benzylcyclohexanone: 2,8-dibenzyl-6-(3-benzylpentyl)-1,2,3,4,7,8,9,10-octahydrophenanthridine.

The following examples further illustrate the invention but are not to be taken as limitations thereof:

*Example 1*

This example illustrates the method of the invention.
In the middle of a Vycor tubular reactor of 1 x 24 inch dimensions there was packed a 7 inch bed of chromia (12.1 wt. percent)-alumina (87.9 wt. percent) catalyst and 6 inch segments of Berl saddles at each end. The tube was mounted at an angle of 20° from horizontal and enclosed in an electrically heated furnace. The temperature was sensed by thermocouples. The reactor was then heated to 450° C. (842° F.) for 0.5 hour while 200 mls./minute of nitrogen was passed through the reactor. The reactor was then cooled to 350° C. (662° F.) and 150 mls./minute of anhydrous ammonia gas was substituted for the nitrogen sweep. Concurrently with ammonia, cyclohexanone was introduced into the reactor from a dropping funnel fitted to the upper end of the reactor at a rate of 6 drops/minute and the reaction was continued until 22.3 grams of cyclohexanone was charged. The average residence time of the reactants in the reactor was 9.6 seconds and the reactant mole ratio of $NH_3$/cyclohexanone was 4.7:1. The reaction products were drawn off from the bottom end of the reactor tube through a tube connected to a receiver attached to a water cooled condenser. The condensation products recovered in the receiver were fractionally distilled and analyzed by gas chromatography. A fraction having a boiling point of 186–188° C. at 3 mm./Hg, a density at 20/4° C. of 1.0071 and at 25/4° C. of 0.9997, a refractive index at $n_D^{20}$ of 1.5455 and at $n_D^{25}$ of 1.5399 and a strong infrared absorption bond at 6.42 and no weak absorption bonds at 6.05 and 2.95 was identified as 6-pentyl-1,2,3,4,7,8,9,10-octahydrophenanthridine. The mole percent yield of this compound based on the charged cyclohexanone was 85% basis the gas chromatographic analysis of products. When the octahydrophenanthridine compound is reacted with picric acid, it forms a picrate derivative of a melting point of 129–131° C., and when said compound is reacted with hydrochloric acid and hydrobromic acid, it forms a hydrochloride salt of a M.P. of 151–153° C. and a hydrobromide salt of a M.P. of 126–128° C.

Example II

The procedure of Example I was essentially repeated with the following exceptions:

The cycloalkanone reactant employed was 3-methylcyclohexanone using an ammonia:3-methylcyclohexanone molar ratio of 5:1. The average residence time of the reactants in the reactor was 9.9 seconds. The condensation products recovered in the receiver were fractionally distilled and analyzed by gas chromatography. A fraction having a boiling point of 177–182° C. at 4 mm./Hg was identified as a mixture of isomeric dimethyl(methylpentyl)octahydrophenanthridines in a yield of 62 mole percent based on the 3-methylcyclohexanone reactant. Particular compounds in this mixture are 3,9-dimethyl-6-(4-methylpentyl) - 1,2,3,4,7,8,9,10 - octahydrophenanthridine; 1,9 - dimethyl - 6 - (4 - methylpentyl) - 1,2,3,4,7,8,9,10 - octahydrophenanthridine; 3,9 - dimethyl - 6 - (2-methylpentyl) - 1,2,3,4,7,8,9,10-octahydrophenanthridine; 1,9 - dimethyl - 6 - (2 - methylpentyl) - 1,2,3,4,7,8,9,10-octahydrophenanthridine; 3,7 - dimethyl - 6 - (4 - methylpentyl) - 1,2,3,4,7,8,9,10 - octahydrophenanthridine; 1,7-dimethyl - 6 - (4 - methylpentyl) - 1,2,3,4,7,8,9,10 - octahydrophenanthridine; 3,7 - dimethyl - 6 - (2 - methylpentyl) - 1,2,3,4,7,8,9,10 - octahydrophenanthridine and 1,7-dimethyl - 6 - (2 - methylpentyl) - 1,2,3,4,7,8,9,10 - octahydrophenanthridine.

Example III

This example further illustrates the method of the invention.

The procedure of Example I was essentially employed except the cycloalkanone reactant was cyclopentanone. Further the average reactant residence time was 9.3 seconds and the reactant ratio of ammonia/cyclopentanone was 4.5/1. The condensation products recovered in the receiver were analyzed by gas chromatography. The main fraction was identified as 5-butyl-1,2,3,6,7,8-hexahydrodicyclopenta[b,d]pyridine. The yield of this fraction based on the cyclopentanone reactant was 43 mole percent.

Example IV

The procedure of Example II was essentially repeated except 4-methylcyclohexanone was substituted for 3-methylcyclohexanone. The condensation products recovered in the receiver were fractionally distilled and analyzed by gas chromatography. The main fraction was identified as 2,8-dimethyl-6-(3-methylpentyl)-1,2,3,4,7,8,9,10-octahydrophenanthridine. The yield of this fraction based on the charge 4-methylcyclohexanone was 71 mole percent.

Example V

The procedure of Example IV was essentially repeated with the following exceptions:

The catalyst employed was silica (75 wt. percent)-magnesia (25 wt. percent). The 4-methylcyclohexanone was employed in a total amount of 44.6 g. using an ammonia:4-methylcyclohexanone molar ratio of 10:1. The average residence time of the reactants in the reactor was 5.0 seconds. The condensation products recovered in the receiver were fractionally distilled and analyzed by gas chromatography. A fraction weighing 24.2 g. having a boiling point of 187–190° C. at 4 mm./Hg, a refractive index at $n_D^{25}$ of 1.5288 was identified as 2,8-dimethyl-6-(3 - methylpentyl) - 1,2,3,4,7,8,9,10 - octahydrophenanthridine. The yield of this fraction based on the charge 4-methylcyclohexanone was 61 mole percent. It formed a hydrochloride salt melting at 137–139° C.

Example VI

This example illustrates the suitability of the various catalysts contemplated herein.

In a stainless steel tube reactor 1″ x 5′ dimensions there was packed a 300 cc. charge of catalyst. The tube was mounted vertically and enclosed in an electrically heated furnace. The temperature was sensed by thermocouples. The reactor was then heated to 310° C. (590° F.) while nitrogen was passed through the reactor. A mixture of cyclohexanone and ammonia was preheated to 260–310° C. (500–590° F.) and was substituted for the nitrogen sweep. The reaction products were drawn off the bottom end of the reactor tube to a tube connected to a receiver attached to a water cooled condenser. The organic condensation products were recovered and analyzed by gas chromatography. The composition of the catalyst employed is described in Table I below and the data and results derived from runs utilizing the catalyst of Table I are described in Table II below:

TABLE I

|  | A | B | C | D | E | F |
|---|---|---|---|---|---|---|
| Catalyst Composition, Wt. percent: |  |  |  |  |  |  |
| Silica | 75 |  | 100 | 62 | 75 |  |
| Alumina |  | 100 |  | 38 | 25 | 88 |
| Chromia |  |  |  |  |  | 12 |
| Magnesia | 25 |  |  |  |  |  |

TABLE II

| Catalyst | A | B | C | D | E | F |
|---|---|---|---|---|---|---|
| Reaction Conditions: |  |  |  |  |  |  |
| Cyclohexanone charged, g. | 918 | 812 | 837 | 857 | 842 | 814 |
| Ammonia charged, g. | 695 | 619 | 645 | 663 | 636 | 691 |
| Ammonia/cyclohexanone molar ratio | 4.36 | 4.39 | 4.44 | 4.45 | 4.35 | 4.89 |
| Residence time, sec. | 8.17 | 9.08 | 9.36 | 8.58 | 8.9 | 8.53 |
| Organic phase recovered, g. | 700 | 584 | 703 | 857 | 842 | 814 |
| Yield of 6-pentyl-1,2,3,4,7,8,9,10-octahydrophenanthridine, mole percent (based on cyclohexanone charged) | 73 | 67 | 62 | 60 | 59 | 57 |

Example VII

This example illustrates the criticality of cycloalkanone reactant.

The procedure of Example I was essentially repeated except the cyclohexanone reactant was replaced with 2-methylcyclohexanone and the reactant residence time in the reactor was 9.9 seconds. Analysis of the final product failed to find any type of heterotricyclic product.

*Example VIII*

This example illustrates the criticality of reactant temperature.

The procedure of Example I was essentially utilized. The test data and results are found below in Table III:

TABLE III

| Conditions | Run No. 87 | Run No. 90 |
|---|---|---|
| Temp., °C | 350 | 450 |
| Molar ratio NH₃/cyclohexanone | 4.7/1 | 4.7/1 |
| Residence time, sec | 9.6 | 8.0 |
| Yield of 6-pentyl-1,2,3,4,7,8,9,10-octahydrophenanthridine, mole percent basis charged cyclohexanone | 85 | 3 |

*Example IX*

This example illustrates the non-predictability of related catalysts to function as catalyst in the production of the heterotricyclic compounds contemplated herein.

The procedure of Example I was essentially employed utilizing various catalysts with the exception in Run 3 the cyclohexanone rate was 3 drops/minute, in Run 6 the NH₃ rate was 300 mls./minute and in Run 10 a reaction temperature of 300° C. was employed. The catalyst composition and results are found below in Table IV.

TABLE IV

| Run No. | Catalyst Composition (wt. percent) | Product,¹ mole percent based on cyclohexanone charge |
|---|---|---|
| 1 | Cr₂O₃ (12.1), Al₂O₃ (87.9) | 85 |
| 2 | K₂Cr₂O₄ (6), K₂CO₃ (8), Fe₂O₃ (86) | Trace |
| 3 | NiO (61), on Kieselguhr (39) | Trace |
| 4 | Ca₃(PO₄)₂ (88), Ni₃(PO₄)₂ (12) | 0 |
| 5 | ZnO (74), Cr₂O₃ (23) | 0 |
| 6 | V₂O₅ (10), K₂SO₄ (23), SiO₂ (65) | 0 |
| 7 | NiS (28.2), WS₂ (52.7) | 0 |
| 8 | CoO (3.4), MoO₃ (9.7), Al₂O₃ (83.6) | Trace |
| 9 | MoS₂ (20), Al₂O₃ (80) | 0 |
| 10 | NiO (21), Cr₂O₃ (18), Al₂O₃ (61) | 0 |

¹ 6-pentyl-1,2,3,4,7,8,9,10-octahydrophenanthridine.

It is to be noted that in Runs 5, 6, 7 and 8 in the above table the analysis of the catalyst is not complete, however, the essential components are identified.

We claim:

1. A method of preparing a heterotricyclic compound selected from the group consisting of:

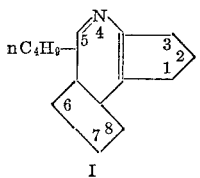

I and

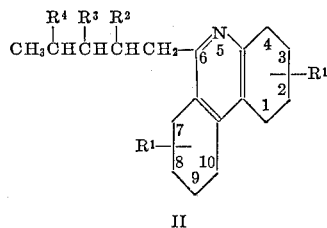

II wherein R¹ is a substituent selected from the group consisting of hydrogen and alkyl of from 1 to 10 carbons, alkaryl from 7 to 10 carbons, aralkyl of from 7 to 10 carbons and aryl from 6 to 10 carbons, wherein two of said R², R³ and R⁴ groups are hydrogen and the remaining group is the same as R¹ and wherein R¹ is never attached to the 4th and 10th ring position carbon, comprising contacting ammonia with cycloalkanone selected from the group consisting of:

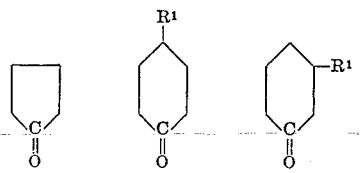

where R¹ is selected from the group consisting of hydrogen and alkyl of from 1 to 10 carbons, aryl of from 6 to 10 carbons, alkaryl of from 7 to 10 carbons, and aralkyl of from 7 to 10 carbons in the presence of a catalyst and in the absence of an oxygen containing gas at a temperature between about 200 and 420° C. and in a molar ratio of ammonia to cycloalkanone of between about 100:1 and 1:5, said catalyst selected from the group consisting of silica, alumina, silica-alumina, silica-magnesia containing 5 to 40 wt. precent magnesia, silica-chromia containing 5 to 40 wt. percent chromia, alumina-magnesia containing 5 to 40 wt. percent magnesia and alumina-chromia containing 5 to 40 wt. percent chromia and mixtures thereof.

2. A method in accordance with claim 1 wherein said cycloalkanone is cyclopentanone and said heterotricyclic compound is 5-butyl-1,2,3,6,7,8-hexahydrodicyclopenta-[b,d]pyridine.

3. A method in accordance with claim 1 wherein said cycloalkanone is cyclohexanone and said heterotricyclic compound is 6-pentyl-1,2,3,4,7,8,9,10-octahydrophenanthridine.

4. A method in accordance with claim 1 wherein said cyclohexanone is 3-methylcyclohexanone and said heterotricyclic compound is a mixture of isomeric dimethyl-6-(methylpentyl) - 1,2,3,4,7,8,9,10 - octahydrophenanthridines.

5. A heterotricyclic compound selected from the group consisting of:

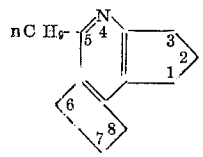

and

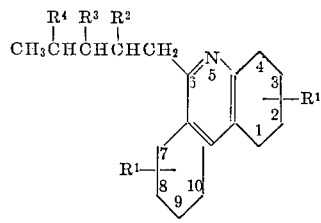

wherein R¹ is a substituent selected from the group consisting of alkyl of from 1 to 10 carbons, alkaryl of from 7 to 10 carbons, aralkyl of from 7 to 10 carbons and aryl of from 6 to 10 carbons, wherein two of said $R^2$, $R^3$ and $R^4$ groups are hydrogen and the other is the same as $R^1$ and wherein $R^1$ is never attached to the 4th and 10th ring position carbon.

6. Isomeric mixture of dimethyl-6-(methylpentyl)-1,2,3,4,7,8,9,10-octahydrophenanthridines.

7. 5 - butyl - 1,2,3,6,7,8 - hexahydrodicyclopenta[b,d]pyridine.

References Cited

UNITED STATES PATENTS

| | | | |
|---|---|---|---|
| 2,425,320 | 8/1947 | Hill | 252—149 |
| 2,692,268 | 10/1954 | Cairns | 260—315 |
| 3,243,438 | 3/1966 | Hellerbach et al. | 260—283 XR |

ALEX MAZEL, *Primary Examiner.*

DONALD G. DAUS, *Assistant Examiner.*